US012460461B2

(12) United States Patent
Minamihara et al.

(10) Patent No.: US 12,460,461 B2
(45) Date of Patent: Nov. 4, 2025

(54) DOOR HINGE USING LINK BETWEEN SHAFTS

(71) Applicant: GLOBAL ARC, INC., Fukuoka (JP)

(72) Inventors: Yoshihito Minamihara, Fukuoka (JP); Shingo Minamihara, Fukuoka (JP); Masaaki Minamihara, Fukuoka (JP); Masahiko Otsuka, Osaka (JP)

(73) Assignee: GLOBAL ARC, INC., Fukuoka (JP)

( * ) Notice: Subject to any disclaimer, the term of this patent is extended or adjusted under 35 U.S.C. 154(b) by 277 days.

(21) Appl. No.: 18/000,589

(22) PCT Filed: Jun. 7, 2021

(86) PCT No.: PCT/JP2021/021648
§ 371 (c)(1),
(2) Date: Dec. 2, 2022

(87) PCT Pub. No.: WO2021/251353
PCT Pub. Date: Dec. 16, 2021

(65) Prior Publication Data
US 2023/0212897 A1 Jul. 6, 2023

(30) Foreign Application Priority Data
Jun. 9, 2020 (JP) ................................ 2020-099732

(51) Int. Cl.
*E05D 7/04* (2006.01)
*E05D 3/08* (2006.01)
*E06B 3/36* (2006.01)

(52) U.S. Cl.
CPC ................ *E05D 7/04* (2013.01); *E05D 3/08* (2013.01); *E06B 3/36* (2013.01)

(58) Field of Classification Search
CPC .......... E05D 7/04; E05D 7/043; E05D 7/009; E05D 7/0027; E05D 3/06; E05D 3/08;
(Continued)

(56) References Cited

U.S. PATENT DOCUMENTS 1,281,731 A * 10/1918 Widlak .................... A45C 3/06 150/123
1,340,862 A * 5/1920 Hornung ............... E05D 7/0423 16/366
(Continued)

FOREIGN PATENT DOCUMENTS

JP H07-2135 U 1/1995
JP 2005-030542 A 2/2005
(Continued)

OTHER PUBLICATIONS

International Search Report for the corresponding application No. PCT/JP2021/021648, dated Jul. 6, 2021, with English translation.

*Primary Examiner* — Emily M Morgan
(74) *Attorney, Agent, or Firm* — LUCAS & MERCANTI, LLP

(57) ABSTRACT

Provided is a hinge and a door mechanism that are mounted on a large-sized and heavy door that requires sealing property and difficult adjustment. The hinge includes: a fulcrum shaft; an adjustment shaft that is disposed adjacently to and parallel to the fulcrum shaft; a housing-side fixing portion that supports the fulcrum shaft; a door-side fixing portion that supports the adjustment shaft; and a link portion that allows the fulcrum shaft and the adjustment shaft to pass therethrough and connects the housing-side fixing portion and the door-side fixing portion to each other, wherein the body fixing portion includes an adjustment-use body fixing portion provided with a link adjustment portion that approximately fixes the link portion to an arbitrary angle with respect to the door-side fixing portion, and the body fixing portion includes at least two adjustment-use body fixing portions.

4 Claims, 9 Drawing Sheets

(58) Field of Classification Search
CPC .............. E05D 3/12; E05D 2007/0438; E05D 2007/0446; E05D 2007/0484; E05D 11/1007; E05D 11/1014; E05D 11/105; E05D 11/06; E05D 11/0054; E05D 7/0415; E05D 7/0018; E05D 7/0054; E05D 3/125; E05F 1/14; E06B 3/36
USPC ........................... 16/365, 375, 366, 368, 280
See application file for complete search history.

(56) References Cited

U.S. PATENT DOCUMENTS

| | | | | |
|---|---|---|---|---|
| 1,659,928 | A * | 2/1928 | Townsend | E05D 3/12 16/366 |
| 2,251,865 | A * | 8/1941 | Barrett | E05D 5/065 16/245 |
| 2,373,955 | A * | 4/1945 | Fuller | E05D 7/0423 126/194 |
| 5,592,717 | A * | 1/1997 | Longo | E05F 1/068 49/245 |
| 6,109,711 | A * | 8/2000 | Hoffman | E05C 9/1875 16/366 |
| 8,381,355 | B2 * | 2/2013 | Pacini | E05D 7/0045 16/240 |
| 2013/0014345 | A1 * | 1/2013 | Park | E05D 5/06 16/248 |
| 2013/0160370 | A1 * | 6/2013 | Chandler | E05D 3/08 16/367 |
| 2018/0126830 | A1 * | 5/2018 | Lampsa | E05D 3/08 |
| 2018/0328089 | A1 * | 11/2018 | Hall | E05D 11/1014 |
| 2018/0341295 | A1 | 11/2018 | Lan et al. | |
| 2022/0170301 | A1 * | 6/2022 | Lampsa | E05D 3/125 |
| 2023/0007891 | A1 * | 1/2023 | Lai | E05D 7/009 |
| 2024/0001742 | A1 * | 1/2024 | Tangitvet | B62D 33/0273 |

FOREIGN PATENT DOCUMENTS

| | | | | |
|---|---|---|---|---|
| JP | 2008-303532 | A | 12/2008 | |
| JP | 6824546 | B1 * | 2/2021 | E05D 3/08 |

* cited by examiner

DOOR HINGE USING LINK BETWEEN SHAFTS

CROSS REFERENCE TO RELATED APPLICATION

This Application is a 371 of PCT/JP2021/021648 filed on Jun. 7, 2021, which, in turn, claims priority of the Japanese patent application no. 2020-099732, filed on Jun. 9, 2020, and the above applications are incorporated herein by reference.

FIELD OF THE INVENTION

The present invention relates to a hinge and a door mechanism that are mounted on a large-sized and heavy door that requires sealing property and difficult adjustment, wherein the hinge and the door mechanism realizes the easy adjustment of the door at the time of installing the door and the operability of the door when the door is opened or closed.

DESCRIPTION OF THE RELATED ART

Conventionally, when a disaster such as a flood caused by heavy rain, a high tide or Tsunami occurs, in a case where water enters an entrance/exit or a passage that through which the inside and outside of a building communicate with each other, water intrudes into the building. As a result, living and activities in a living space or a site in case of a public facility become impossible. In a case where the building is a shop or a warehouse, displayed goods and inventories are drenched with water thus bringing about a large damage.

Further, recently, a tendency is observed where heavy rainfall-related disasters within a short time frequently occur regardless of regions due to a climate change. In particular, with respect to important facilities such as a power plant which functions as a key station of an infrastructure, electric rooms and machine rooms that are installed at relay points for the power plant and house electric facilities and machines for controlling the supply of electricity and the like, when water intrudes into these important facilities, the intrusion of water directly leads to cutting off of the supply of electricity thus largely affecting daily lives, and also considerably obstructing the restoration work that becomes necessary after such a disaster. Accordingly, a disaster prevention measure to prevent such a water hazard is considered as an urgent task to be fulfilled.

Further, it is often the case where such electric room, the machine room or the like requires a large-sized door for carrying in and out facilities or the like. In view of the above, studies have been made so as to apply a pressing force from a door to a door frame as uniform as possible using a biaxial hinge by taking into account sealing property such as water tightness.

However, a large-sized door is extremely heavy and hence, it is not easy to manually close a door that uses a biaxial hinge having an unstable movable range accurately such that a uniform pressure is applied to a door frame from the door. Further, as illustrated in FIG. 8, even when a plurality of biaxial hinges H are disposed on a door suspension side, each hinge H is connected to a housing 111 and a door P in a single form and hence, the door P cannot sufficiently ensure rigidity for supporting the door P. As a result, there exists a drawback a door distal end side of the door P easily falls downward (F) with respect to a door suspension side.

Further, in installing such a large-sized door P in a building or the like, it is extremely difficult to perform the adjustment such that the inclinations of axes of the plurality of hinges H are aligned so that the door P can be smoothly opened or closed without imparting a load on the door P. Accordingly, the cumbersomeness at the time of installing the door P cannot be ignored.

Under such circumstances, for example, in a biaxial hinge disclosed in FIG. 1 or the like of JP-A-2008-303532 (patent literature 1), an adjustment member 16 is configured in an advanceable and retractable manner in a door 20 direction by way of a threaded hole 6*a* formed in a connecting wing member 5 that connects a housing 1 and the door 20, and a movable range of the door 20 is narrowed to a predetermined range by the adjustment member 16 so as to make manual closing of the door to a door frame easy at an approximately uniform pressure as much as possible.

Further, in the biaxial hinge disclosed in FIG. 6 of patent literature 1, both end portions of one first pivot shaft 9 that extends vertically are supported by fixing wing members 2 that are connected to the housing 1 on a door suspension side, the first pivot shaft 9 is made to pass through respective one ends of the plurality of connecting wing members 5, and respective individual second pivot shafts 14 are fixedly supported by a plurality of movable wing members 11 that pass through the other ends of the connecting wing members 5, and the door 20 is supported by the movable wing members 11. With such a configuration, the rigidity of the door 20 is enhanced, and the adjustment of the inclination of an axis of the hinge can be easily performed.

PRIOR ART REFERENCE

Patent Literature

Patent Literature 1: JP 2008-303532 A

SUMMARY OF THE INVENTION

Problems to be Solved by the Invention

It is true that the biaxial hinge according to patent literature 1 is excellent with respect to the following points. That is, the biaxial hinge according to patent literature 1 is excellent with respect to the point that a movable range of the door is narrowed to a predetermined range so as to make manual closing of the door to the door frame easy at an approximately uniform pressure as much as possible. The biaxial hinge illustrated in FIG. 6 of patent literature 1 is excellent with respect to the point that the rigidity of the door for supporting the door can be enhanced so as to suppress falling down of the distal end side of the door by forming the first pivot shaft using one shaft. The biaxial hinge illustrated in FIG. 6 of patent literature 1 is excellent with respect to the point that the adjustment of the inclination of the axis of the hinge can be performed relatively easily.

However, even when the movable range of the door can be narrowed by the adjustment member, the rotation of the door in which the second pivot shaft functions as an initiation point still occurs and hence, a drawback on an unstable movable range including the rotation of the door in which the first pivot shaft functions as an initiation point is not eliminated so long as the hinge is a biaxial hinge. Accordingly, it is not easy to accurately manually close a large-sized door at an approximately uniform pressure.

Further, only both end portions of one first pivot shaft are connected to the housing at the door suspension side by the fixing wing members, and the individual movable wing members and the door are connected to the first pivot shaft by way of the plurality of connecting wing members. Accordingly, the elongated first pivot shaft is liable to be deflected as a whole. Further, the door on the door suspension side is brought into a state where the hinges each form a single body are individually connected to the door on the door suspension side and hence, it is not considered that the rigidity of the door for supporting the door is largely enhanced.

Still further, although the plurality of movable wing members that respectively individually fixedly support the second pivot shaft are connected to the first pivot shaft by way of the connecting wing members, there still remains a cumbersomeness that it is necessary to finely adjust the respective second pivot shafts at the time of connecting the movable wing members to the door such that the door is opened or closed smoothly without applying a load on the door.

The present invention has been made in view of the above-mentioned circumstances, and it is an object of the present invention to provide a hinge and a door mechanism that are mounted on a large-sized and heavy door that requires sealing property and difficult adjustment, and can realize the increase of rigidity of the door, the easy adjustment of the door at the time of installing the door and the operability of the door when the door is opened or closed.

Means to Solve the Technical Problem

To achieve the above-mentioned object, the present invention provides a hinge and a door mechanism having the following configurations.

According to one embodiment of the invention, there is provided a hinge that includes: an elongated fulcrum shaft that has a height substantially equal to a height of a door and extends vertically; an elongated adjustment shaft that has a height substantially equal to the height of the fulcrum shaft and is disposed adjacently to and parallel to the fulcrum shaft; and a body fixing portion that is formed of a housing-side fixing portion that fixedly supports the fulcrum shaft and is fixed to a housing-side, a door-side fixing portion that fixedly supports the adjustment shaft and is fixed to a door side, and a link portion that allows the fulcrum shaft and the adjustment shaft to pass therethrough and connects the housing-side fixing portion and the door-side fixing portion to each other, wherein the body fixing portion includes an adjustment-use body fixing portion provided with a link adjustment portion that approximately fixes the link portion to an arbitrary angle with respect to the door-side fixing portion, the link adjustment portion is formed of adjustment members that are respectively disposed such that the adjustment members are configured to advance or retract in a direction toward the door on left and right sides of the adjustment shaft, and the body fixing portion includes at least two adjustment-use body fixing portions.

According to one embodiment of the invention, there is provided the hinge where the adjustment-use body fixing portion is provided to at least both end portions of the hinge, and the body fixing portion is provided between a space formed between the adjustment-use body fixing portions.

According to one embodiment of the invention, the link adjustment portion is configured such that a distal end portion of the adjustment member is brought into contact with a front surface of the link portion in response to an advancing and retracting operation of the adjustment member.

According to one embodiment of the invention, there is provided a door mechanism where the hinge is used in a swing door.

According to one embodiment of the invention, there is provided the door mechanism where the door mechanism is formed of a dividable door that is dividable in a vertical direction.

Effects of the Invention

According to one embodiment of the invention, the hinge includes: the elongated fulcrum shaft that has the height substantially equal to the height of the door and extends vertically; the elongated adjustment shaft that has the height substantially equal to the height of the fulcrum shaft and is disposed adjacently to and parallel to the fulcrum shaft; and the body fixing portion that is formed of the housing-side fixing portion that fixedly supports the fulcrum shaft and is fixed to a housing-side, the door-side fixing portion that fixedly supports the adjustment shaft and is fixed to the door side, and the link portion that allows the fulcrum shaft and the adjustment shaft to pass therethrough and connects the housing-side fixing portion and the door-side fixing portion to each other, wherein the body fixing portion includes the adjustment-use body fixing portion provided with the link adjustment portion that approximately fixes the link portion to the arbitrary angle with respect to the door-side fixing portion, the link adjustment portion is formed of the adjustment members that are respectively disposed such that the adjustment members are configured to advance or retract in the direction toward the door on left and right sides of the adjustment shaft, and the body fixing portion includes at least two adjustment-use body fixing portions. With such a configuration, at the time of performing the initial adjustment, the door-side fixing portion is brought into a state where the door-side fixing portion is rotatable about the adjustment shaft, and the door is pressed to the housing-side such that the door is closed at an approximately uniform pressure. Then, the rotation of the door-side fixing portion in which the adjustment shaft is used as an initiation point is approximately fixed by the link adjustment portion. Accordingly, although the hinge has two axes, it is possible to allow only the fulcrum shaft to contribute to the rotation of the door and hence, the movable range is centralized at the time of using the door whereby it is possible to provide a hinge that enables an operator to easily and accurately close the door such that an approximately uniform pressure is applied even in a case where the door is a large-sized door.

The elongated fulcrum shaft and the elongated adjustment shaft are arranged in the longitudinal direction of the housing-side and the door suspension side on the door side. With such a configuration, the hinge supports the door as an integral body and hence, the rigidity of the entire door can be largely enhanced.

Further, the hinge adopts the integral structure where all link portions are connected to the same fulcrum shaft and the same adjustment shaft. Accordingly, it is possible to largely reduce cumbersomeness of adjusting the respective inclinations of both shafts at the time of installing the door and hence, an adjustment operation for smoothly opening or closing the door without applying a load on the door can be performed easily. Further, the link adjustment portion is formed of the adjustment members that are disposed on the left and right sides of the adjustment shaft in a state where the adjustment members are advanceable and retractable in the door direction on the left and right sides of the adjustment shaft. Accordingly, with the simple configuration, it is possible to almost fix the rotation of the door-side fixing portion using the adjustment shaft as the initiation point.

According to one embodiment of the invention, the adjustment-use body fixing portion is provided to at least both end portions of the hinge, and the body fixing portion is provided between a space formed between the adjustment-use body fixing portions. With such a configuration, the entire rigidity of the door can be further enhanced.

According to one embodiment of the invention, the link adjustment portion is configured such that the distal end portion of the adjustment member is brought into contact with the front surface of the link portion in response to an advancing and retracting operation of the adjustment member. With such a configuration, it is possible to easily form the adjustment-use body fixing portion that includes the link adjustment portion using the common body fixing portion as the base and hence, the hinge can be manufactured at a low cost.

According to one embodiment of the invention, the door can be maintained in a high rigidity state by the door mechanism of the swing door that uses the above-mentioned hinge. Accordingly, even when the door is the large-sized door, the door can be opened or closed smoothly with no load and without causing the displacement of the axis or falling of the door distal side after installing the door. Further, the door exhibits substantially the same simple operability of the hinge at the time of opening or closing the door as the door provided with the hinge having one axis. Still further, it is possible to provide the door mechanism having high sealing property by allowing an operator to manually, easily and accurately close the door such that the substantially uniform pressure is applied to the door frame from the door.

According to one embodiment of the invention, with the use of the door mechanism where the hinge is used in the swing door that is vertically dividable, even in a situation where a large-sized door cannot be carried in a building as it is due to a door installation environment, the door is dividable and hence, the door can be easily carried in the building and can be easily installed.

DETAILED DESCRIPTION OF EMBODIMENTS

The gist of a hinge according to the present invention lies in that the hinge includes: an elongated fulcrum shaft that has a height substantially equal to a height of a door and extends vertically; an elongated adjustment shaft that has a height substantially equal to the height of the fulcrum shaft and is disposed adjacently to and parallel to the fulcrum shaft; and a body fixing portion that is formed of a housing-side fixing portion that fixedly supports the fulcrum shaft and is fixed to a housing-side, a door-side fixing portion that fixedly supports the adjustment shaft and is fixed to a door side, and a link portion that allows the fulcrum shaft and the adjustment shaft to pass therethrough and connects the housing-side fixing portion and the door-side fixing portion to each other, wherein the body fixing portion includes an adjustment-use body fixing portion provided with a link adjustment portion that approximately fixes the link portion to an arbitrary angle with respect to the door-side fixing portion, and the body fixing portion includes at least two adjustment-use body fixing portions. That is, at the time of performing the initial adjustment, the door-side fixing portion is brought into a state where the door-side fixing portion is rotatable about the adjustment shaft, and the door is pressed to the housing-side such that the door is closed at an approximately uniform pressure. Then, the rotation of the door-side fixing portion using the adjustment shaft as an initiation point is approximately fixed by the link adjustment portion.

Accordingly, although the hinge has two axes, it is possible to allow only the fulcrum shaft to contribute to the rotation of the door and hence, the movable range is centralized at the time of using the door whereby it is possible to provide a hinge that enables an operator to easily and accurately close a door such that an approximately uniform pressure is applied even in a case where the door is a large-sized door.

Hereinafter, one embodiment of the hinge 1 and the door mechanisms D1, D2 according to the present invention is described with reference to drawings. In the description of the present invention, with respect to structures and parts equal on left and right sides or in a left-right symmetry, these structures and parts are given with identical symbols in principle, and only one of the left and right structures or one of the left and right parts is described and the description of another structure or another part is suitably omitted.

A front surface 82 of a door 81 in the description made hereinafter indicates an outside of a building, and a back surface 87 of the door 81 indicates the inside of the building.

Figure 1:
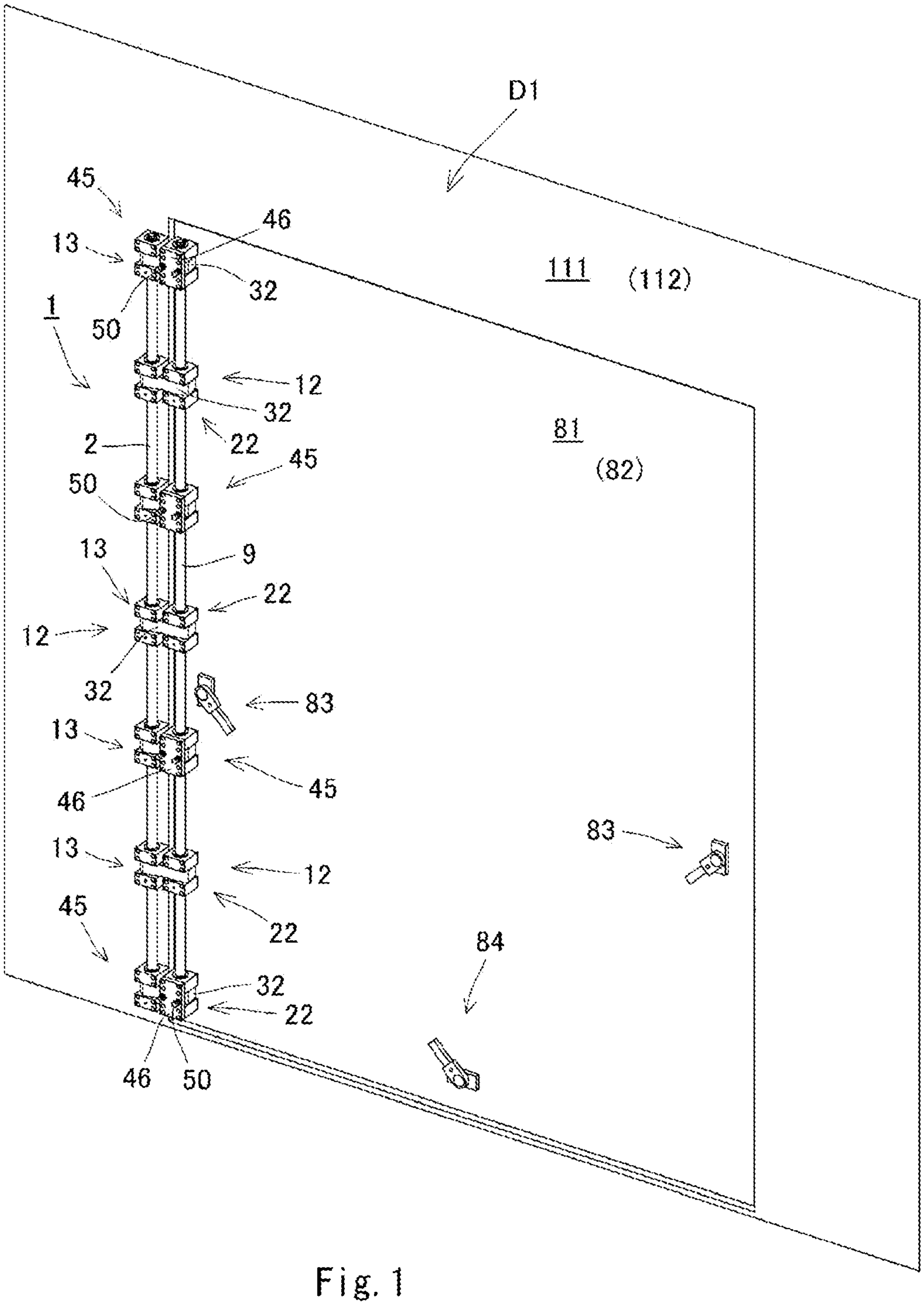
FIG. 1 is a perspective explanatory view illustrating a surface of a door mechanism provided with a hinge according to this embodiment.

The hinge 1 according to the embodiment of the present invention, as illustrated in FIG. 1, includes: an elongated fulcrum shaft 2 that has a length substantially equal to a height of the door 81 and extends vertically; an elongated adjustment shaft 9 that has a length of substantially equal to the length of the fulcrum shaft 2 and is disposed adjacently to and parallel to the fulcrum shaft 2, and a body fixing portion 12 that is formed of a housing-side fixing portion 13 that fixedly supports the fulcrum shaft 2 and is fixed to a housing 111 side, a door-side fixing portion 22 that fixedly supports the adjustment shaft 9 and is fixed to a door 81 side, and a link portion 32 that allows the fulcrum shaft 2 and the adjustment shaft 9 to pass therethrough and connects the housing-side fixing portion 13 and the door-side fixing portion 22 to each other, wherein an adjustment-use body fixing portion 45 includes a link adjustment portion 46 that approximately fixes the link portion 32 to an arbitrary angle with respect to the door-side fixing portion 22. The hinge 1 includes at least two or more adjustment-use body fixing portions 45.

Figure 6:
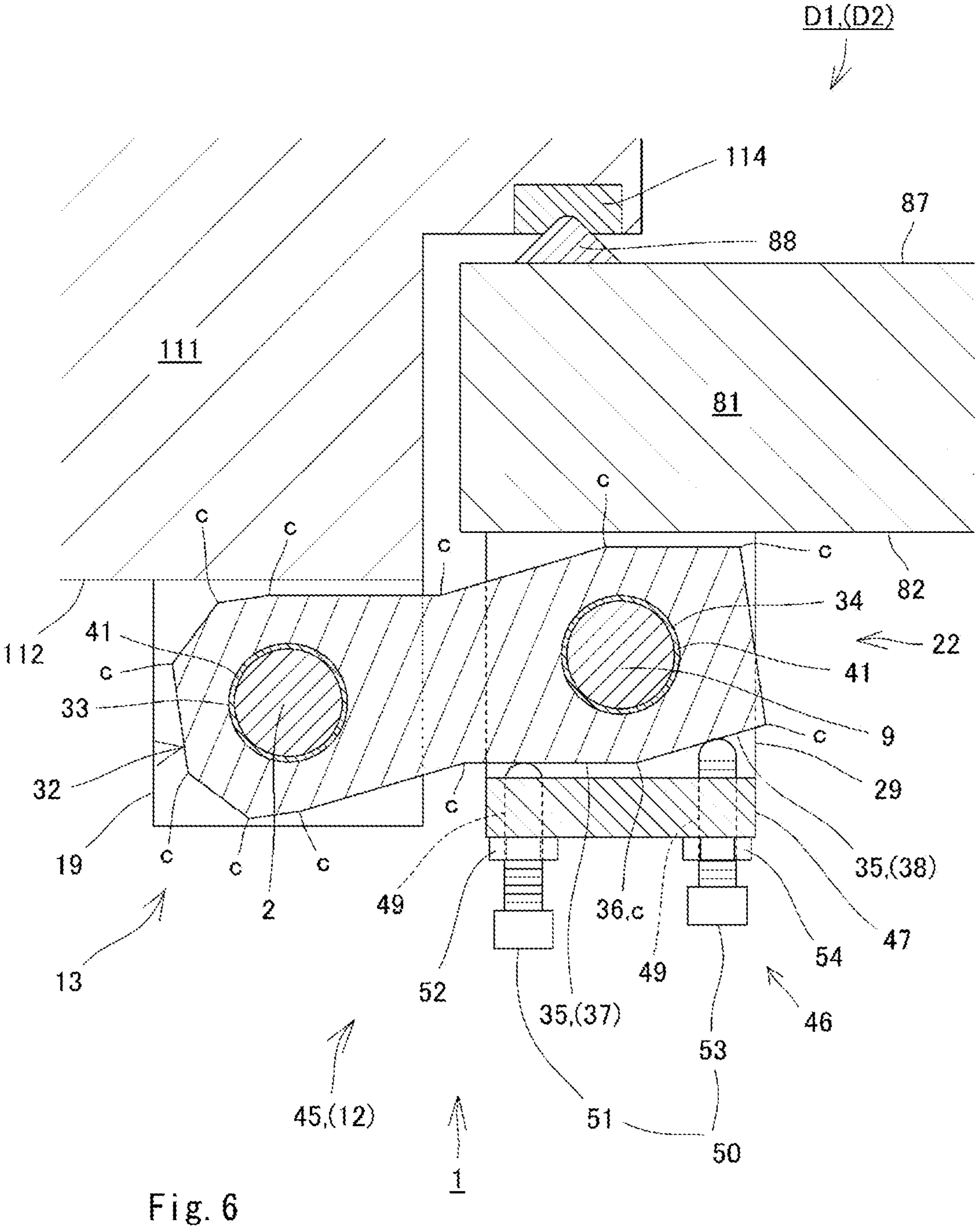
FIG. 6 is a cross-sectional view taken along a line A-A in FIG. 5.

The adjustment-use body fixing portion 45 is disposed at least both end portions of the hinge 1, and the body fixing portion 12 is disposed between the adjustment-use body fixing portions 45. The link adjustment portion 46 is formed of adjustment members 50 that are respectively disposed on left and right sides of the adjustment shaft 9 such that the adjustment member 50 is advanceable and retractable in the door 81 direction. Further, as illustrated in FIG. 6, the link adjustment portion 46 is configured such that distal end portions of the adjustment member 50 are brought into contact with a front side surface 35 of the link portion 32 by an advancing and retracting manipulation of the adjustment member 50.

The hinge 1 having the configuration described above is adopted by a swing door illustrated in FIG. 1, for example, as a door mechanism D1.

Figure 2:
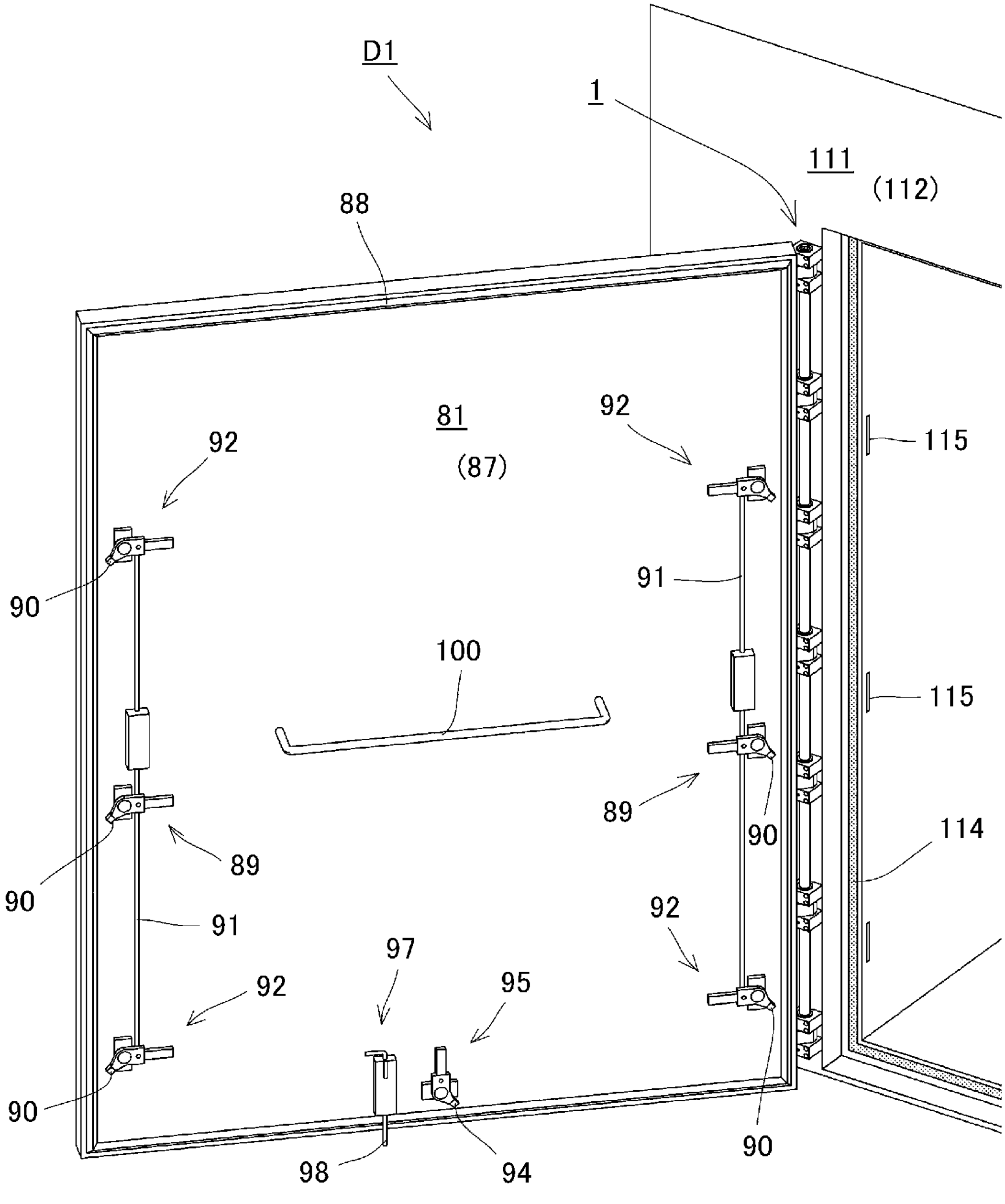
FIG. 2 is a perspective explanatory view illustrating a back surface of the door mechanism provided with the hinge according to this embodiment.

Specifically, as illustrated in FIG. 1 and FIG. 2, an opening is formed in a portion of the housing 111 such as a wall that forms a building. By mounting the hinge 1 according to this embodiment on the front surface 82 of the door 81 that closes the opening and the surface 112 of the housing 111 thus connecting the front surface 82 and the surface 112 to each other, the opening is openable and closable using the hinge 1 as a swinging initiation point.

In this embodiment, the description is made with respect to the hinge 1 where four adjustment-use body fixing portions 45 and three body fixing portions 12 are provided to the fulcrum shaft 2 and the adjustment shaft 9.

A protruding portion 88 having a triangular shape as viewed in cross section (see also FIG. 6) is formed in a frame shape on an outer periphery of the back surface 87 of the door 81. A water stopping rubber 114 having a rectangular shape as viewed in cross section that is brought into water-tight contact with the protruding portion 88 (also see FIG. 6) is formed on an inner side wall on a housing 111 side along the opening in a frame shape in the same manner as the protruding portion 88.

Further, at an approximately center between a door suspension side and a door distal end side of the front surface 82 of the door 81, the front engaging grip portions 83 that is connected in an interlocking manner with mechanisms on the back surface 87 of the door 81 is mounted. On the back surface 87 of the door 81, the rear engaging grip portions 89 having lateral engaging pawls 90 that are directly connected with the front engaging grip portions 83, and rear engaging and connecting grip portions 92 having lateral engaging pawls 90 that are operated in an interlocking manner with link mechanisms 91 disposed above and below rear engaging grip portions 89 are mounted.

The respective lateral engaging pawls 90 are simultaneously rotated by rotatably manipulating the front engaging grip portions 83 at the time of closing the door 81, and engage with lateral engaging reception portions 115 having a recessed shape that are formed on left and right inner side walls of the housing 111.

Further, on an approximately center portion of a lower end edge of the front surface 82 of the door 81, a front-lower-portion engaging grip portion 84 that is connected to a back surface 87 of the door 81 in an interlocking manner is formed. On the back surface 87 of the door 81, a rear-lower-portion engaging grip portion 95 having a lower engaging pawl 94 that is directly connected to the front-lower-portion engaging grip portion 84 is formed.

The lower engaging pawl 94 is formed such that the lower engaging pawl 94 is rotated by rotatably operating the lower-portion engaging grip portion 84, and engages with a lower engaging receiving portion having a recessed shape (not illustrated in the drawing) formed on an inner wall of the housing 111 on a lower side.

Further, on an approximately center portion of a lower end edge of the back surface 87 of the door 81, a so-called flush bolt 97 is disposed.

A bearing (not illustrated in the drawings) is formed on an inner wall of the housing 111 on a lower side. A movable shaft 98 of the flush bolt 97 passes through the bearing and engages with the bearing. On an approximately center portion of the back surface 87 of the door 81, a handle 100 having a U shape as viewed in a plan view is formed in a protruding manner.

Accordingly, when the door 81 is closed from the outside of the door 81, an operator manually almost closes the door 81 by pressing the door 81 and, thereafter, the front engaging grip portions 83 and the front-lower-portion engaging grip portion 84 are rotatably operated so that the water stopping rubber 114 presses the protruding portion 88 whereby the door 81 can be water-tightly closed.

On the other hand, at the time of closing the door 81 from the inside of the door 81, an operator pulls the door 81 to the inside while griping the handle 100 so as to almost close the door 81 and, thereafter, the operator rotatably operates the rear engaging grip portions 89 and the rear-lower-portion engaging grip portion 95 so as to make the flush bolt 97 engage with the rear engaging grip portions 89 and the rear-lower-portion engaging grip portion 95. With such operations, the door 81 can be closed water-tightly by pressing the water stopping rubber 114 to the protruding portion 88.

With the provision of the hinge 1 and the door mechanism D1, at the time of performing the initial adjustment, the door-side fixing portion 22 is brought into a state where the door-side fixing portion 22 is rotatable about the adjustment shaft 9, and the door 81 is pressed to the housing 111 side such that the door 81 is closed at an approximately uniform pressure. Then, the rotation of the door-side fixing portion 22 using the adjustment shaft 9 as an initiation point is approximately fixed by the link adjustment portion 46. Accordingly, although the hinge 1 has two axes, it is possible to allow only the fulcrum shaft 2 to contribute to the rotation of the door 81 and hence, the movable range is centralized at the time of using the door 81 whereby it is possible to provide the hinge 1 that enables an operator to easily and accurately close the door 81 such that an approximately uniform pressure is applied even in a case where the door 81 is a large-sized door.

Next, the hinge 1 and the door mechanism D1 according to the embodiment are more specifically described in detail.

Figure 3:
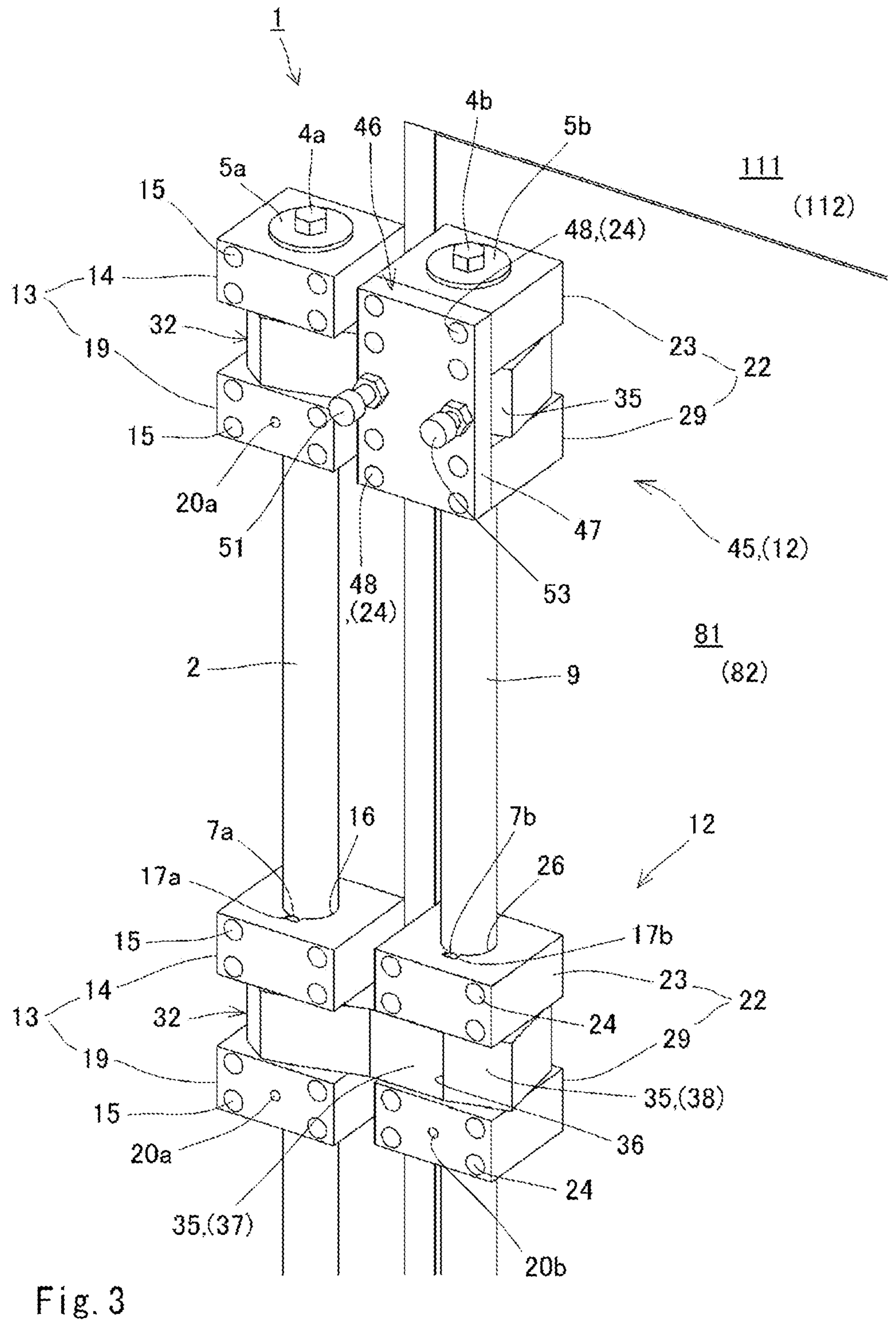
FIG. 3 is a partially enlarged perspective view illustrating an upper portion side of the hinge according to this embodiment.

First, as illustrated in FIG. 3, the body fixing portion 12 is formed of the fulcrum shaft 2, the adjustment shaft 9, the housing-side fixing portion 13 that fixedly supports the fulcrum shaft 2 and is fixed to the housing 111 side, the door-side fixing portion 22 that fixedly supports the adjustment shaft 9 and is fixed to the door 81 side, and the link portion 32 that allows the fulcrum shaft 2 and the adjustment shaft 9 to pass therethrough and connects the housing-side fixing portion 13 and the door-side fixing portion 22.

The adjustment-use body fixing portion 45 described later is formed by providing the link adjustment portion 46 to the body fixing portion 12. The structure of the adjustment-use body fixing portion 45 is equal to the structure of the body fixing portion 12 except for the link adjustment portion 46.

Figure 4:
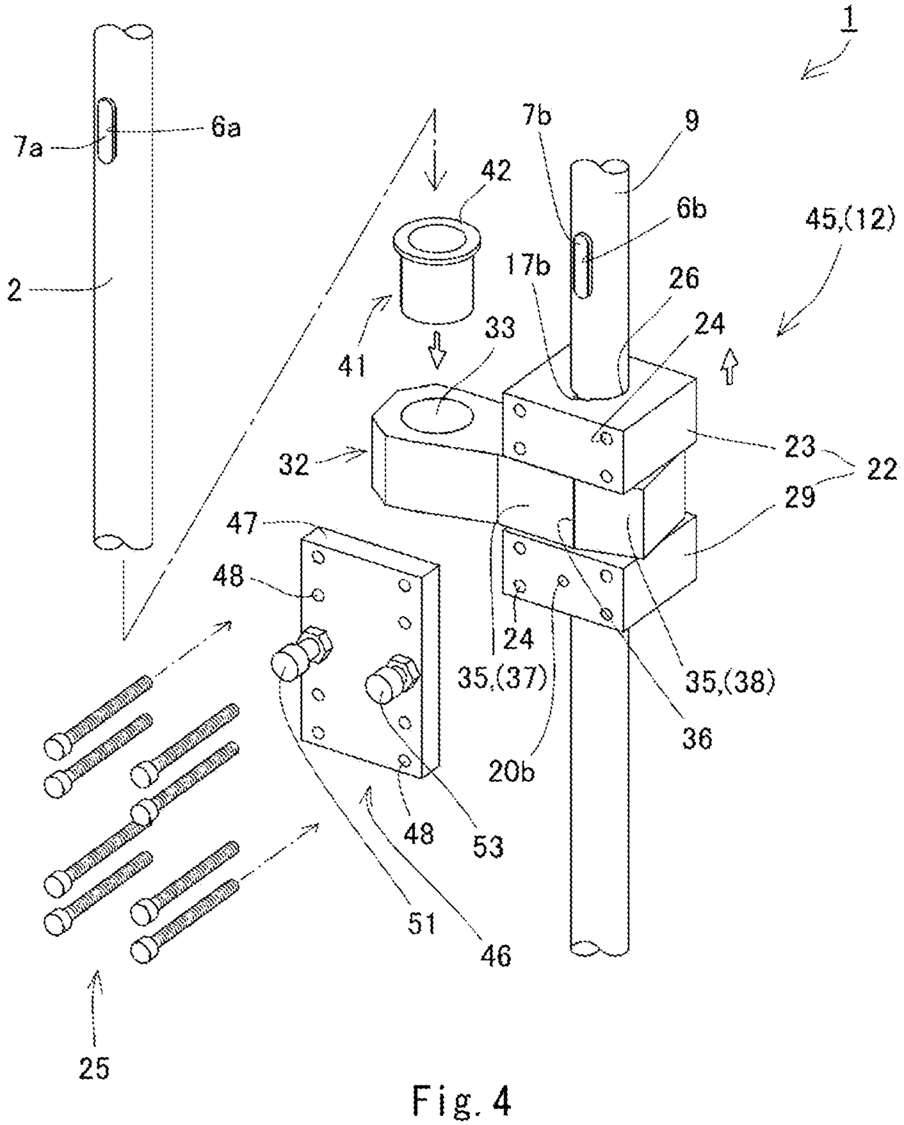
FIG. 4 is an exploded perspective view illustrating a portion of the configuration of the hinge according to this embodiment.
Figure 5:
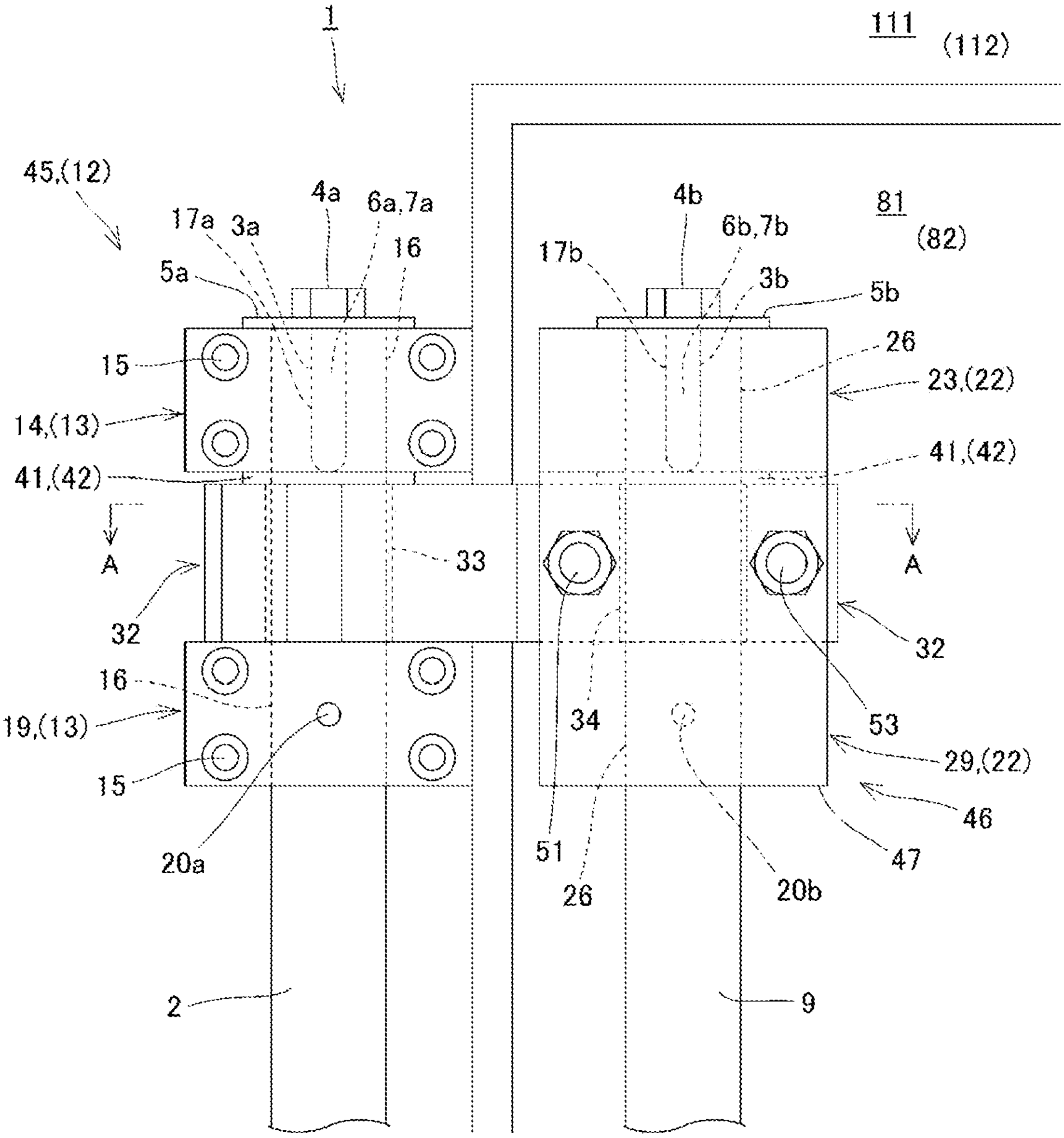
FIG. 5 is a partial front see-through view illustrating an upper portion side of the hinge according to this embodiment.
Figure 8A:
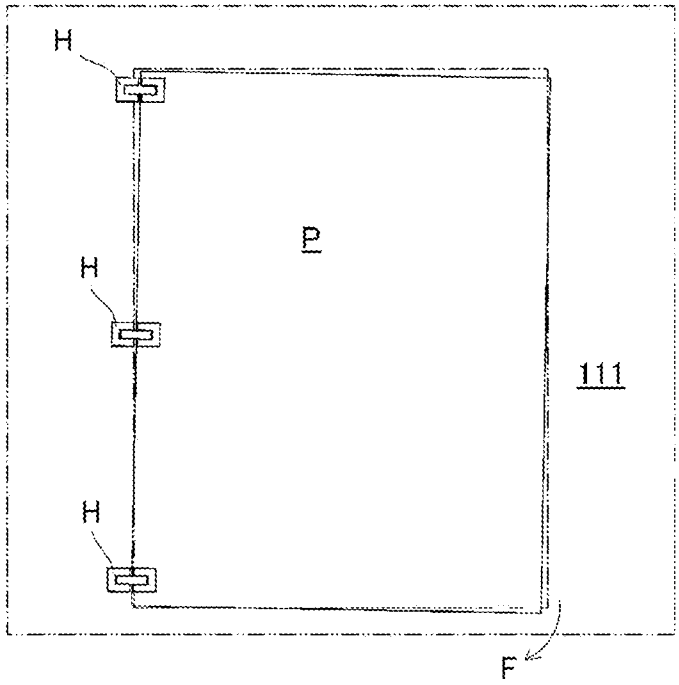
FIG. 8A is a simplified front view illustrating a surface of a conventional door mechanism provided with a two-shaft hinge.
Figure 8B:
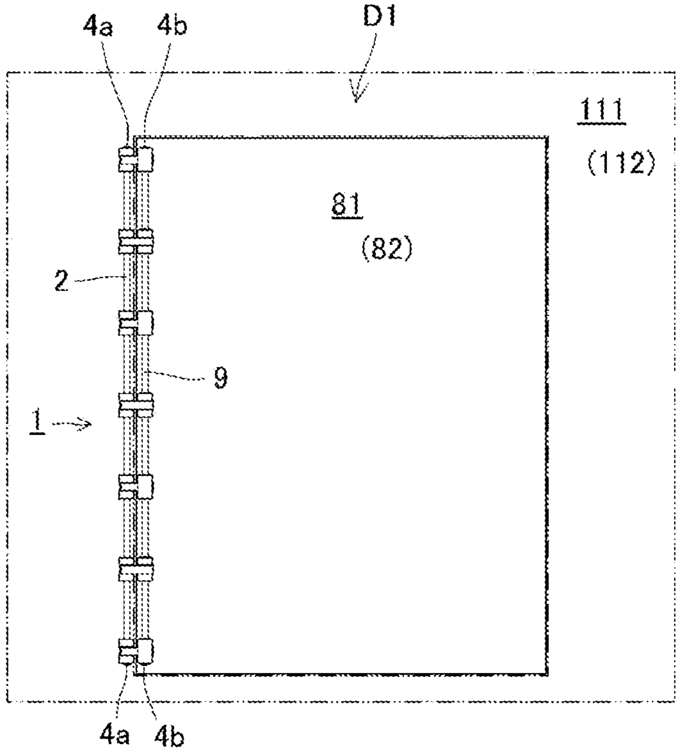
FIG. 8B is a simplified front view illustrating a surface of the door mechanism provided with the hinge according to this embodiment.

Further, as illustrated in FIG. 8B, the fulcrum shaft 2 is formed of one elongated rod-shaped metal shaft that has the length substantially equal to the height of the door 81, and extends vertically. As illustrated in FIG. 5, a female threaded hole 3*a* is formed in both end portions (the illustration of the lower end portion being omitted), and as illustrated in FIG. 4 and FIG. 5, a key mounting groove 6*a* having a vertically elongated concave shape is formed on a peripheral surface of the fulcrum shaft 2 at areas in the vicinity of both end edges and at an intermediate portion, and an elongated key 7*a* that protrudes from the peripheral surface is fitted in the key mouthing groove 6*a* with a small play.

Male screws 4*a* that fixedly support the fulcrum shaft 2 by way of the housing-side fixing portions 13 arranged at an upper end and a lower end of the door frame are threadedly mounted in the female threaded holes 3*a* formed at both end portions of the fulcrum shafts 2 in a state where the male screws 4*a* pass through washers 5*a*. The keys 7*a* that protrude from the peripheral side surfaces of the fulcrum shaft 2 in the vicinity of both end edges of the fulcrum shaft 2 engage with the key grooves 17*a* formed on the housing-side fixing portions 13.

That is, both ends of the fulcrum shaft 2 are fixed to the male screws 4*a* by the keys 7*a* that engage with the key grooves 17*a* formed on the housing-side fixing portions 13 arranged at upper end and the lower end of the door frame.

The key 7*a* formed on the peripheral side surface of an intermediate of the fulcrum shaft 2 engages with the key groove 17*a* formed on the housing-side fixing portion 13 at the position corresponding to the key 7*a* and hence, a rotation prevention effect of the fulcrum shaft 2 is further enhanced.

As illustrated in FIG. 3 and FIG. 5, the housing-side fixing portion 13 is formed of a housing-side upper piece 14 and a housing-side lower piece 19 that are respectively formed of a metal-made rectangular flat block body. Four housing-side bolt insertion holes 15 that penetrate in a horizontal direction are formed in an opposedly facing side surface on one side such that the housing-side bolt insertion holes 15 are disposed in the vicinity of side-surface corner portions of the respective pieces 14, 19, and a fulcrum shaft insertion hole 16 having a diameter slightly smaller than an outer diameter of the fulcrum shaft 2 are formed in a penetrating manner in the respective pieces 14, 19 in a vertical direction.

With respect to the housing-side upper piece 14, the above-mentioned key groove 17*a* having a longitudinal concave shape with which the key 7*a* of the fulcrum shaft 2 engages from above is formed on an inner side wall of the fulcrum shaft insertion hole 16.

In a center portion of the housing-side lower piece 19 that is surrounded by four housing-side bolt insertion holes 15 formed in the housing-side lower piece 19, a temporary fixing hole 20*a* that penetrates the fulcrum shaft insertion hole 16 in a horizontal direction is formed. A set screw not illustrated in the drawings is threadedly inserted into the temporary fixing hole 20*a* that penetrates in a horizontal direction as the fulcrum shaft insertion hole 16.

The set screw that is threadedly inserted into the temporary fixing hole 20*a* is biased by pressing the peripheral side surface of the fulcrum shaft 2 so as to prevent the housing-side lower piece 19 from falling downward at the time of assembling the hinge 1 according to this embodiment. A female threaded hole into which the set screw is threadedly inserted may be formed in the fulcrum shaft 2 at a position corresponding to the set screw.

The housing-side fixing portion 13 that is formed of the housing-side upper piece 14 and the housing-side lower piece 19 is arranged at an upper predetermined position by moving the housing-side upper piece 14 and the housing-side lower piece 19 upward from a lower end side of the fulcrum shaft 2 using the fulcrum shaft 2 that passes through the fulcrum shaft insertion hole 16 as a guide in a state where a link portion 32 described later is arranged between the housing-side upper piece 14 and the housing-side lower piece 19. Then, the housing-side fixing portion 13 is fixed to the housing 111 by making a bolt not illustrated in the drawing that is inserted into the housing-side bolt insertion hole 15 threadedly engage with a female threaded hole not illustrated in the drawing that is formed in a housing 111 side.

In this case, by making a male screw 4*a* that passes through a washer 5*a* threadedly engage with the female threaded hole 3*a* formed on an upper end portion of the fulcrum shaft 2 from above in advance, the housing-side upper piece 14 of the uppermost housing-side fixing portion 13 is brought into contact with the washer 5*a*. Accordingly, it is possible to prevent the uppermost housing-side fixing portion 13 from being removed beyond an upper end of the fulcrum shaft 2.

Further, the housing-side fixing portions 13 that are arranged on the fulcrum shaft 2 are sequentially arranged by moving the housing-side fixing portions 13 from a lower side to an upper side of the fulcrum shaft 2 by making use of the fulcrum shaft insertion holes 16. In such an operation, by sequentially mounting only the key 7*a* corresponding to the portion where the housing-side fixing portion 13 that is an object to be arranged is positioned in the key mounting groove 6*a* formed on the fulcrum shaft 2 each time the housing-side fixing portion 13 is arranged, it is possible to avoid the occurrence of a situation where the key 7*a* in the intermediate portion of the fulcrum shaft 2 becomes an obstacle when the housing-side fixing portion 13 is moved along the fulcrum shaft 2.

After mounting the lowermost housing-side fixing portion 13 on the fulcrum shaft 2 in a state where the fulcrum shaft 2 passes through the housing-side fixing portion 13, a male screw 4*a* that passes through the washer 5*a* from below is threadedly inserted into a female threaded hole 3*a* formed on a lower end portion of the fulcrum shaft 2. With such a configuration, the housing-side lower piece 19 of the lowermost housing-side fixing portion 13 is brought into contact with and is placed on the washer 5*a*. Accordingly, it is possible to prevent the lowermost housing-side fixing portion 13 from being removed beyond a lower end of the fulcrum shaft 2.

Further, the housing-side fixing portion 13 can be fixed to the housing 111 by making a bolt not illustrated in the drawing that passes through the housing-side bolt insertion hole 15 threadedly engage with a female threaded hole not illustrated in the drawing that is formed on the housing 111 side.

In this embodiment, the housing-side fixing portion 13 is formed of two members consisting of the housing-side upper piece 14 and the housing-side lower piece 19. However, the housing-side fixing portion 13 may be modified or changed without departing from the gist of the present invention. For example, the housing-side fixing portion 13 may be formed into a U shape as viewed in a side view by interposing a vertical piece between the housing-side upper piece 14 and the housing-side lower piece 19 on a side positioned on the housing 111 side.

Further, as illustrated in FIG. 8B, the adjustment shaft 9 is formed of one shaft that is elongated vertically with a height substantially equal to a height of the door 81 in the same manner as the fulcrum shaft 2. the adjustment shaft 9 has a round bar shape, and is made of metal. As illustrated in FIG. 5, the female threaded holes 3*b* are formed on both end portions (the illustration of the lower end portion being omitted), while as illustrated in FIG. 4 and FIG. 5, the key mounting groove 6*b* that is elongated vertically and has a concave shape is formed on the peripheral side surfaces of portions in the vicinity of both end portions and the intermediate portion respectively, and a key 7*b* that is elongated vertically and protrudes from the peripheral side surface is loosely is fitted in the key mounting groove 6*b* with a small play.

The male screws 4*b* that fixedly supports the door B1 by way of the door-side fixing portions 22 arranged at the upper end and the lower end threadedly engage with the female threaded holes 3*b* that are formed on both end portions of the adjustment shafts 9 in a state where the male screws 4*b* pass through the washer 5*b*. The key 7*b* that protrudes from the peripheral side surface of the adjustment shaft 9 in the vicinity of both end edges of the adjustment shaft 9 engages with the key groove 17*b* that is formed on the door-side fixing portion 22 and engages with the key 7*b*.

That is, both end portions of the adjustment shaft 9 are fixed by the male screws 4*b* in a non-rotatable state by the keys 7*b* that engage with the key grooves 17*b* formed on the door-side fixing portion 22 arranged at the upper end and the lower end.

The key 7*b* that is formed on the peripheral surface of the intermediate portion of the adjustment shaft 9 engages with the key groove 17*b* formed on the door-side fixing portion 22 at positions corresponding to the keys 7*b* and hence, an effect of preventing the rotation of the adjustment shaft 9 is further enhanced.

As illustrated in FIG. 3 to FIG. 5, the door-side fixing portion 22 is formed of a door-side upper piece 23 and a door-side lower piece 29 that are respectively formed of a metal-made rectangular flat block body. Four door-side bolt insertion holes 24 that penetrate in a horizontal direction are formed in an opposedly facing side surface on one side are formed such that the door-side bolt insertion holes 24 are disposed in the vicinity of side-surface corner portions of the respective pieces 23, 29, and an adjustment shaft insertion hole 26 having a diameter slightly smaller than an outer diameter of the adjustment shaft 9 are formed in the respective pieces 23, 29 in a vertical direction.

With respect to the door-side upper piece 23, the above-mentioned key groove 17*b* having a longitudinal concave shape with which the key 7*b* of the adjustment shaft 9 engages from above is formed on an inner side wall of the adjustment shaft insertion hole 26.

In a center portion of the door-side lower piece 29 that is surrounded by four door-side bolt insertion holes 24 formed in the door-side lower piece 29, a temporary fixing hole 20*b* that penetrates the adjustment shaft insertion hole 26 in a horizontal direction is formed. A set screw not illustrated in the drawings is threadedly inserted into the temporary fixing hole 20*b*.

The set screw that is threadedly inserted into the temporary fixing hole 20*b* is biased by pressing the peripheral side surface of the adjustment shaft 9 so as to prevent the door-side lower piece 29 from falling downward at the time of assembling the hinge 1 according to this embodiment. A female threaded hole into which the set screw is threadedly inserted may be formed in the adjustment shaft 9 at a position corresponding to the set screw.

The door-side fixing portion 22 that is formed of the door-side upper piece 23 and the door-side lower piece 29 are arranged at an upper predetermined position by moving the door-side upper piece 23 and the door-side lower piece 29 upward from a lower end side of the adjustment shaft 9 using the adjustment shaft 9 that passes through the adjustment shaft insertion hole 26 as a guide in a state where a link portion 32 described later is arranged in a gap formed between the door-side upper piece 23 and the door-side lower piece 29. Then, the door-side fixing portion 22 is fixed to the door 81 by making a bolt 25 that is inserted into the door-side bolt insertion hole 24 threadedly engage with a female threaded hole not illustrated in the drawing that is formed in a door 81 side.

In this case, by making a male screw 4*b* that passes through a washer 5*b* threadedly engage with the female threaded hole 3*b* formed on an upper end portion of the adjustment shaft 9 from above in advance, the door-side upper piece 23 of the uppermost door-side fixing portion 22 is brought into contact with the washer 5*b*. Accordingly, it is possible to prevent the uppermost door-side fixing portion 22 from being removed beyond an upper end of the adjustment shaft 9.

Further, the door-side fixing portions 22 that are arranged on the adjustment shaft 9 are sequentially arranged by moving the door-side fixing portions 22 from a lower side to an upper side of the adjustment shaft 9 by making use of the adjustment shaft insertion holes 26. In such an operation, by sequentially mounting only the key 7*b* corresponding to the portion where the door-side fixing portion 22 that is an object to be arranged is positioned in the key mounting groove 6*b* formed on the adjustment shaft 9 each time the door-side fixing portion 22 is arranged, it is possible to avoid the occurrence of a situation where the key 7*b* in the intermediate portion of the adjustment shaft 9 becomes an obstacle when the door-side fixing portion 22 is moved along the adjustment shaft 9.

After mounting the lowermost door-side fixing portion 22 on the adjustment shaft 9 in a state where the adjustment shaft 9 passes through the door-side fixing portion 22, a male screw 4*b* that passes through the washer 5*b* from below is threadedly inserted into a female threaded hole 3*b* formed on a lower end portion of the adjustment shaft 9. With such a configuration, the door-side lower piece 29 of the lowermost door-side fixing portion 22 is brought into contact with and is placed on the washer 5*b*. Accordingly, it is possible to prevent the lowermost door-side fixing portion 22 from being removed beyond a lower end of the adjustment shaft 9.

Further, the door-side fixing portion 22 can be fixed to the door 81 by making a bolt 25 that passes through the door-side bolt insertion hole 24 threadedly engage with a female threaded hole not illustrated in the drawing that is formed on the door 81 side.

In this embodiment, the door-side fixing portion 22 is formed of two members consisting of the door-side upper piece 23 and the door-side lower piece 29. However, the door-side fixing portion 22 may be modified or changed without departing from the gist of the present invention. For example, the door-side fixing portion 22 may be formed into a U shape as viewed in a side view by interposing a vertical piece between two pieces, that is, the door-side upper piece 23 and the door-side lower piece 29 on the door 81 side.

Further, as illustrated in FIG. 6, the link portion 32 is made of metal, is formed in an approximately 8-shaped loop as viewed in a plan view, and has a predetermined thickness. A fulcrum shaft rotation hole 33 and an adjustment shaft rotation hole 34 are formed in the link portion 32 in a vertically penetrating manner such that the link portion 32 is formed in the 8-shaped loop as viewed in a plan view.

A flanged bushing 41 that is made of synthetic resin and has a circular cylindrical shape is press-fitted into the fulcrum shaft rotation hole 33 and the adjustment shaft rotation hole 34 respectively from above such that a flange 42 of the flanged bushing 41 is directed upward. One flanged bushing 41 is arranged between the housing-side upper piece 14 of the housing-side fixing portion 13 and the housing-side lower piece 19 of the door-side fixing portion 13, and the other flanged bushing 41 is arranged between the door-side upper piece 23 of the door-side fixing portion 22 and the door-side lower piece 29 the door-side fixing portion 22. The flanged bushings 41 allow the fulcrum shaft 2 and the adjustment shaft 9 to pass through respectively.

With respect to the specific profile of the link portion 32, as viewed in FIG. 6 that is a plan view, the link portion 32 has twelve corner portions c. The link portion 32 is formed such that an approximately center portion of the link portion 32 is narrowed, a width of the link portion 32 is gradually widened in a direction toward the fulcrum shaft rotation hole 33 on a left side and in a direction toward the adjustment shaft rotation hole 34 on a right side, and both end portion sides are narrowed.

Particularly, a vertex angle having a convex shape where the center of the adjustment shaft rotation hole 36 forms the corner portion of a front side surface 35 as viewed in a front view is formed as a reference corner portion 36 such that a lower side of the adjustment shaft rotation hole 34 is formed in a downwardly convex shape as viewed in FIG. 6. A left side of the reference corner portion 36 (a side that overlaps with a left side of the adjustment shaft rotation hole as viewed in a front view) is formed as a return side 37, and a right side of the reference corner portion 36 (a side that overlaps with a right side of the adjustment shaft rotation hole 34 as viewed in a front view) is formed as a pressing side 38.

The sides other than the return side 37 and the pressing side 38 are formed such that the link portion 32 is not brought into contact with the housing 111 and the door 81 as much as possible. However, the shape of the link portion 32 is not limited to the shape described in the embodiment, and can be modified or changed without departing from the gist of the present invention.

Next, in the above-mentioned body fixing portion 12, the adjustment-use body fixing portion 45 includes the link adjustment portion 46 that approximately fixes the link portion 32 with respect to the door-side fixing portion 22 in an adjustable manner to an arbitrary angle.

As illustrated in FIG. 4 and FIG. 6, eight door-side-bolt front surface insertion holes 48 are formed in a base plate 47 made of metal and having a rectangular plate shape at areas in the vicinity of left and right long sides of the base plate 47. Eight door-side-bolt front surface insertion holes 48 correspond to respective four door-side bolt insertion holes 24 that are formed in the door-side upper piece 23 and the door-side lower piece 29 of the door-side fixing portion 22 respectively. Adjustment female threaded holes 49 are formed in center portions of left and right long sides of the base plate 47, and adjustment members 50 that are formed of a push bolt and a return bolt and threadedly engage with the adjustment female threaded holes 49 in a horizontal direction.

The adjustment members 50 includes: the return bolt 51 and a nut 52 disposed on a left side; and the push bolt 53 and a nut 54 disposed on a right side. The base plate 47 is positioned on a front surface of the door-side fixing portion 22 that forms the body fixing portion 12 such that the door-side-bolt insertion holes 24 and the door-side-bolt front surface insertion holes 48 communicate with each other.

A distal end of the return bolt 51 is configured such that, due to an advancing or retracting operation of the return bolt 51, the distal end of the return bolt 51 is brought into contact with a return side 37 formed on the link portion 32. A distal end of the push bolt 53 is also configured such that, due to an advancing or retracting operation of the push bolt 53, the distal end of the push bolt 53 is brought into contact with a pressing side 38 formed on the link portion 32. With such a configuration, the link portion 32 can be approximately fixed with respect to the door-side fixing portion 22 at an arbitrary angle in a state where the distal end of the return bolt 51 and the distal end of the push bolt 53 are respectively and simultaneously brought into contact with the return side 37 and the pressing side 38.

Figure 7A:
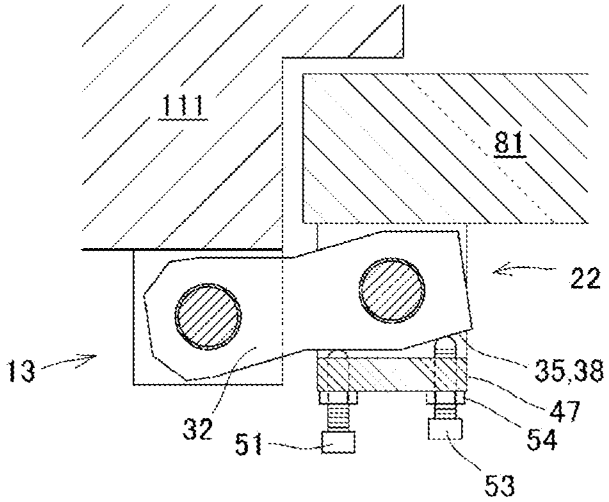
FIG. 7A is a simplified cross-sectional view of FIG. 6, and FIG. 7B and FIG. 7C are simplified cross-sectional views in which an angle of a link portion in FIG. 6 is changed.

More specifically, as illustrated in FIG. 7A, when both bolts 51, 53 are fixed by the nuts 52, 54 in a state where the push bolt 53 is made to advance more than the return bolt 51, the link portion 32 can be approximately fixed with respect to the door-side fixing portion 22 at an angle that the link portion 32 closes the door 81.

Figure 7B:
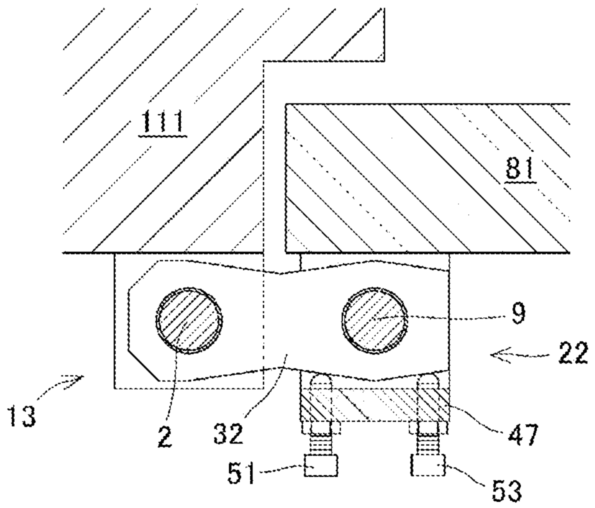

As illustrated in FIG. 7B, when both bolts 51, 53 are fixed by the nuts 52, 54 in a state where the push bolt 53 and the return bolt 51 are made to advance substantially the same length, the link portion 32 can be approximately fixed with respect to the door-side fixing portion 22 at an angle that the link portion 32 is arranged parallel to the door 81.

Figure 7C:
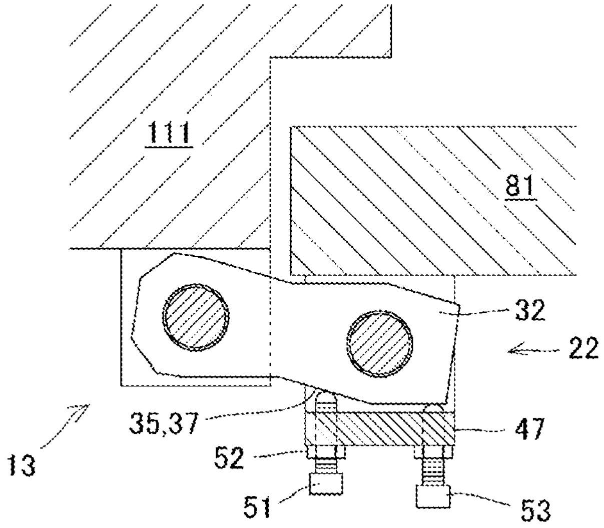

Further, as illustrated in FIG. 7C, when both bolts 51, 53 are fixed by the nuts 52, 54 in a state where the return bolt 51 is made to advance more than the push bolt 53, the link portion 32 can be approximately fixed with respect to the door-side fixing portion 22 at an angle that the link portion 32 opens the door 81.

The structure and the shape of the link adjustment portion 46 are not limited to those described in this embodiment, and can be modified or changed without departing from the gist of the present invention.

Figure 9:
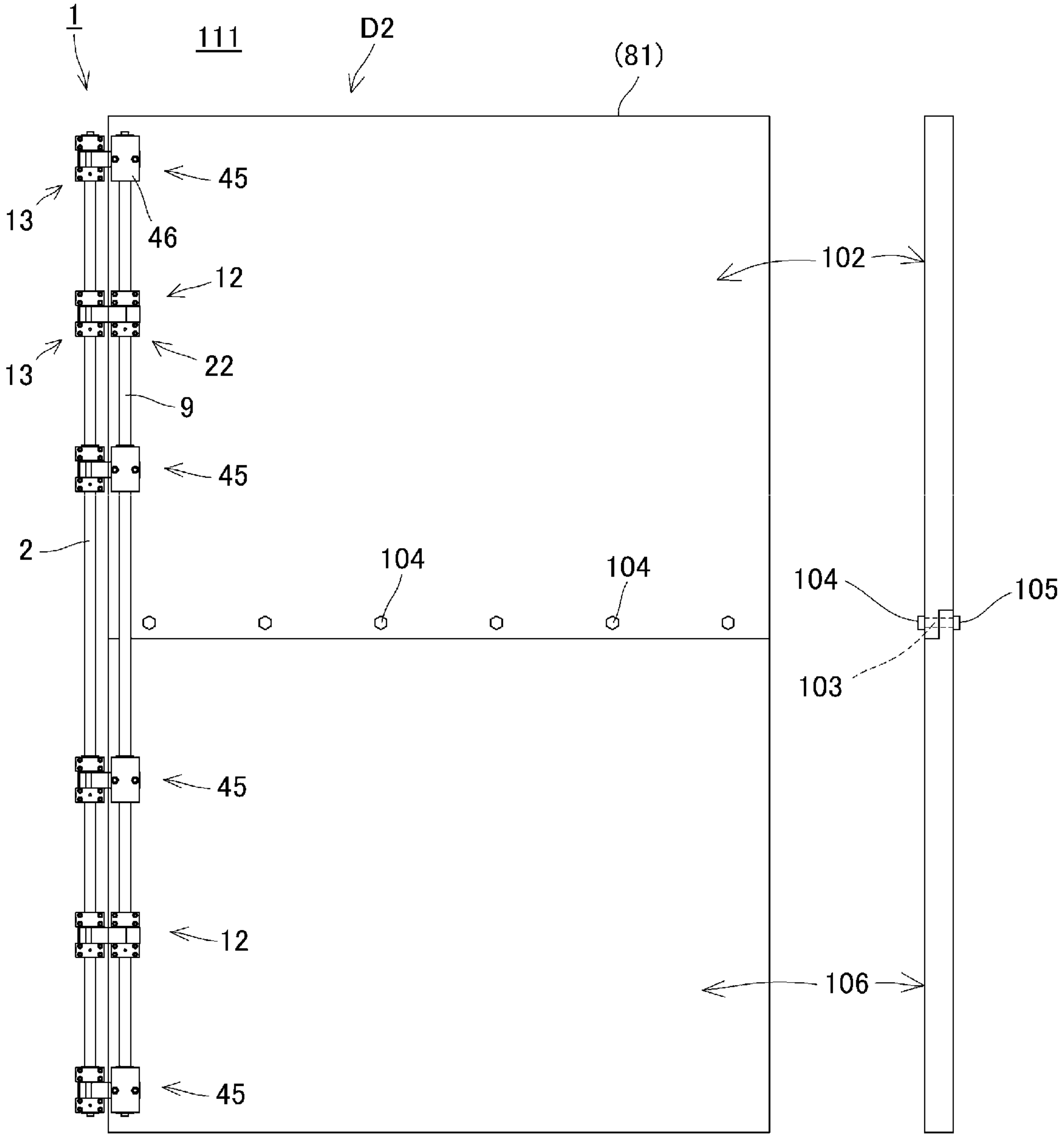
FIG. 9 is a simplified front view illustrating a surface of another door mechanism provided with a hinge according to this embodiment and a simplified cross-sectional view of another door mechanism.

The hinge 1 according to this embodiment can be adopted as a door mechanism D2 of a swing door where the door is dividable in a vertical direction as described in FIG. 9.

The door mechanism D2 is configured such that a hinge 1 includes four adjustment-use body fixing portions 45 and two body fixing portions 12 with respect to a fulcrum shaft 2 and an adjustment shaft 9, wherein on an upper door 102 and a lower door 106, the adjustment-use body fixing portions 45 are disposed above and below each body fixing portion 12. With such a configuration, the link portion 32 can be easily adjusted to an arbitrary angle with respect to the door-side fixing portion 22.

A lower end portion of the upper door 102 is formed in an L shape in cross section, and an upper end portion of the lower door 106 engages with the lower end portion of the upper door 102 and is formed in an L shape in cross section.

Further, a plurality of bolt holes 103 are formed in engaging portions of the upper door 102 and the lower door 106 in a state where the respective plurality of bolts holes 103 communicate with each other, and the engaging portions are connected to each other by a plurality of bolts 104 and a plurality of nuts 105 and hence, the upper door 102 and the lower door 106 function as one sheet of door 81.

By interposing a water stop rubber between the upper door 102 and the lower door 106, waterproof property of the portion can be enhanced.

As has been described above, by forming the hinge 1 and the door mechanism D1 according to the embodiment as described above, the hinge 1 includes: the elongated fulcrum shaft 2 that has the length substantially equal to the length of the door 81 and extends vertically; the elongated adjustment shaft 9 that has the height substantially equal to the height of the fulcrum shaft 2 and is disposed adjacently to and parallel to the fulcrum shaft 2; and the body fixing portion 12 that is formed of the housing-side fixing portion 13 that fixedly supports the fulcrum shaft 2 and is fixed to a housing 111 side, the door-side fixing portion 22 that fixedly supports the adjustment shaft 9 and is fixed to the door 81 side, and the link portion 32 that allows the fulcrum shaft 2 and the adjustment shaft 9 to pass therethrough and connects the housing-side fixing portion 13 and the door-side fixing portion 22 to each other, wherein the body fixing portion 12 includes the adjustment-use body fixing portion 45 provided with the link adjustment portion 46 that approximately fixes the link portion 32 to the arbitrary angle with respect to the door-side fixing portion 22, and the body fixing portion 12 includes at least two adjustment-use body fixing portions 45. With such a configuration, at the time of performing the initial adjustment, the door-side fixing portion 22 is brought into a state where the door-side fixing portion 22 is rotatable about the adjustment shaft 9, and the door 81 is pressed to the housing 111 side such that the door 81 is closed at an approximately uniform pressure. Then, the rotation of the door-side fixing portion 22 in which the adjustment shaft 9 is used as an initiation point is approximately fixed by the link adjustment portion 46. Accordingly, although the hinge 1 has two axes, it is possible to allow only the fulcrum shaft 2 to contribute to the rotation of the door 81 and hence, the movable range is centralized at the time of using the door 81 whereby it is possible to provide the hinge 1 that enables an operator to easily and accurately close the door 81 such that an approximately uniform pressure is applied even in a case where the door 81 is a large-sized door.

The elongated fulcrum shaft 2 and the elongated adjustment shaft 9 are arranged in the longitudinal direction of the housing 111 side and the door suspension side on the door 81 side. With such a configuration, the hinge 1 supports the door 81 as an integral body and hence, the rigidity of the entire door 81 can be largely enhanced.

Further, the hinge 1 adopts the integral structure where all link portions 32 are connected to the same fulcrum shaft 2 and the same adjustment shaft 9. Accordingly, it is possible to largely reduce cumbersomeness of adjusting the respective inclinations of both shafts 2, 9 at the time of installing the door 81 and hence, an adjustment operation for smoothly opening or closing the door 81 without applying a load on the door can be performed easily.

The adjustment-use body fixing portion 45 is provided to at least both end portions of the hinge 1, and the body fixing portion 12 is provided between a space formed between the adjustment-use body fixing portions 45. With such a configuration, the entire rigidity of the door 81 can be further enhanced.

The link adjustment portion 46 is formed of the adjustment members 50 that are respectively arranged such that the link adjustment portion 46 is advanceable and retractable in a direction toward the door 81 on left and right sides of the adjustment shaft 9. Accordingly, with the simple configuration, the rotation of the door-side fixing portion 22 using the adjustment shaft as the initiation point can be surely approximately fixed.

The link adjustment portion 46 is configured such that the distal end portion of the adjustment member 50 is brought into contact with the front surface 35 of the link portion 32 in response to an advancing and retracting operation of the adjustment member 50. With such a configuration, it is possible to easily form the adjustment-use body fixing portion 45 that includes the link adjustment portion 46 using the common body fixing portion 12 as the base and hence, the hinge 1 can be manufactured at a low cost.

The door 81 can be maintained in a high rigidity state by the door mechanism D1 of the swing door that uses the above-mentioned hinge 1. Accordingly, even when the door 81 is the large-sized door, the door 81 can be opened or closed smoothly with no load and without causing the displacement of the axis or falling of the door distal side after installing the door 81. Further, the door 81 exhibits substantially the same simple operability of the hinge 1 at the time of opening or closing the door 81 as the door provided with the hinge having one axis. Still further, it is possible to provide the door mechanism D1 having high sealing property by allowing an operator to manually, easily and accurately close the door 81 such that the substantially uniform pressure is applied to the door frame from the door 81.

With the use of the door mechanism D2 where the hinge 1 is used in the swing door that is vertically dividable, even in a situation where a large-sized door cannot be carried in a building as it is due to a door installation environment, the door is dividable and hence, the door can be easily carried in the building and can be easily installed.

Although the present invention has been described with respect to preferred embodiments of the hinge 1 and the door mechanisms D1, D2, the present invention is not limited to the particular embodiment, and various modifications and changes are conceivable.

DESCRIPTION OF IDENTIFIERS

D1: door mechanism
D2: another door mechanism
1: hinge
2: fulcrum shaft
9: adjustment shaft
12: body fixing portion
13: housing-side fixing portion
22: door-side fixing portion
32: link portion
35: front side surface
45: adjustment-use body fixing portion
46: link adjustment portion
50: adjustment member
81: door
111: housing

What is claimed is:

1. A hinge comprising:

an elongated fulcrum shaft that has a height substantially equal to a height of a door and extends vertically;

an elongated adjustment shaft that has a height substantially equal to the height of the fulcrum shaft and is disposed adjacently to and parallel to the fulcrum shaft; and a plurality of body fixing portions, each of the plurality of body fixing portions being formed of a housing-side fixing portion that fixedly supports the fulcrum shaft and is fixable to a housing-side, a door-side fixing portion that fixedly supports the adjustment shaft and is fixable to a door side, and a link portion that allows the fulcrum shaft and the adjustment shaft to pass therethrough and connects the housing-side fixing portion and the door-side fixing portion to each other, wherein at least two of the plurality of body fixing portions include a link adjustment portion that fixes the link portion to an arbitrary angle with respect to the door-side fixing portion, the link adjustment portion comprises a base plate and adjustment members that are respectively disposed such that the adjustment members are configured to advance or retract in a direction toward the door on left and right sides of the adjustment shaft, and the base plate is attached to the door-side fixing portion, and the adjustment members penetrate the base plate and contact the link portion, and the link adjustment portion is configured such that each distal end portion of the adjustment members is brought into contact with a front surface of the link portion in response to an advancing and retracting operation of the adjustment members.

2. The hinge according to claim 1, wherein two of the plurality of body fixing portions are provided to both end portions of the hinge and each include the link adjustment portion, and others of the plurality of body fixing portions are provided within a space formed between the two of the plurality of body fixing portions provided to the end portions.

3. A door mechanism comprising the hinge according to claim 1 and a swing door, wherein the hinge is attached to the swing door.

4. The door mechanism according to claim 3, wherein the swing door is formed of an upper door and a bottom door, and the upper door is attached to the bottom door.

* * * * *